United States Patent [19]

Dany et al.

[11] 4,097,656
[45] Jun. 27, 1978

[54] PROCESS FOR IMPARTING ANTISTATIC PROPERTIES TO PLASTICS

[75] Inventors: Franz-Josef Dany, Erftstadt; Gerhard Mietens, Efferen; Erich Schallus, Koln-Klettenberg, all of Germany

[73] Assignee: Hoechst Aktiengesellschaft, Frankfurt am Main, Germany

[21] Appl. No.: 674,573

[22] Filed: Apr. 7, 1976

[30] Foreign Application Priority Data

Apr. 10, 1975 Germany .............................. 2515632

[51] Int. Cl.$^2$ ............................................. C08K 3/04
[52] U.S. Cl. ...................................... 526/1; 260/42.46; 260/42.49; 423/445; 423/450
[58] Field of Search ........................... 252/511; 526/1; 260/42.46, 42.49; 423/445, 450

[56] References Cited

U.S. PATENT DOCUMENTS

| | | | |
|---|---|---|---|
| 2,597,741 | 5/1952 | Macey | 252/511 |
| 2,683,669 | 7/1954 | Coler | 260/42.46 |
| 2,781,246 | 2/1957 | Goldtrap | 423/450 |
| 3,024,092 | 3/1962 | Gessler | 423/445 |
| 3,422,056 | 1/1969 | Carton | 260/42.46 |
| 3,574,547 | 4/1971 | Hinson | 423/445 |
| 3,775,357 | 11/1973 | Nemeth | 260/42.49 |
| 3,799,788 | 3/1974 | Jordan | 423/445 |

OTHER PUBLICATIONS

Kirk–Othmer, Encyclopedia of Chemical Technology, 2nd ed., vol. 4, pp. 251-267, 276-280.

*Primary Examiner*—Paul R. Michl
*Attorney, Agent, or Firm*—Connolly and Hutz

[57] ABSTRACT

Antistatic properties are imparted to plastics by blending a pulverulent plastics material and, if desired further addends, with conductive carbon black and making the resulting blend into a moulding composition. The plastics are more particularly blended with 4 to 12 weight % of conductive carbon black having a water absorption stiffness (AS-number) of 15 to 35, a specific electric resistance of $10^{-1}$ up to $10^{-3}$ ohms . cm under a moulding pressure of 100 to 180 atmospheres absolute, a bulk density of 100 to 180 g/liter, a BET-surface area of 100 to 1000 m$^2$/g. The carbon black is made by a process wherein an aqueous suspension of carbon black having an AS-number higher than 15 is intimately blended at temperatures within the range 5° and 120° C, under pressure within the range 1 and 20 atmospheres absolute, in liquid phase at a pH-value of 7 to 10, and for a period of 1 to 20 minutes, with vaporizable liquid aliphatic or cycloaliphatic hydrocarbons, the carbon black is separated from liquid matter, then heated and thereby freed from hydrocarbons and water, and finally annealed for 20 to 30 minutes at 200° up to 2200° C. The aqueous suspension is prepared by subjecting hydrocarbons, which are liquid at room temperature, to thermal conversion at 1200° to 2000° C, under pressures within the range 1 and 80 atmospheres absolute, and in the presence of oxygen or an oxygen-containing gas, and water scrubbing the resulting carbon black-containing reaction gas.

5 Claims, No Drawings

PROCESS FOR IMPARTING ANTISTATIC PROPERTIES TO PLASTICS

It is an important requirement for plastics material which is likely to come into contact with readily combustible substances (regardless of whether they are in the liquid, gaseous or solid state) to have antistatic properties as these are indispensable to avoid such phenomena as fire outbreaks or explosions, which may be caused by electric spark discharge. In the mining industries, it is even imperative that the materials used have antistatic properties so as to avoid fire damp explosions. It is also good practice for readily combustible liquids, such as organic solvents, to be placed in containers which are not susceptible to sparking caused by an electric charge. The same is true concerning highly inflammable solids, such as phosphorus or special blends for pyrotechnical uses, which have to be stored and handled in containers that are unable to acquire an electrostatic charge. As described in DIN (German Industrial Standard) test 53 596, a surface resistance not higher than $10^9$ ohms is the factor which critically determines the antistatic behaviour of any material.

Various processes permitting antistatic properties to be imparted to plastics material have already been described. They are based on the use of special substances which are either incorporated with the plastics, or applied to the plastics' surface. The substances so applied and the moisture contained in the ambient air effect the formation of electrically conductive layers, in the plastics, which avoid electric discharge. These processes fail, however, to produce reliable results in all those cases in which the ambient air is insufficiently moist.

A process used in the rubber processing industries for improving the electric conductivity and mechanical properties of rubber comprises incorporating special types of carbon black. Attempts made to use this process for the treatment of plastics material have shown that a good deal of commercially available grades of carbon black is not as effective in plastics as in rubber. It has also been found that the plastics' mechanical properties are considerably impaired upon the incorporation of carbon black in the standard proportions employed for rubber.

It has been described that acceptable antistatic properties can be imparted to polyvinyl chloride by treating it with commercially available conductive carbon black. To this end, it is however necessary for the plastics blend to be admixed with at least 20 weight % of carbon black. In other words, the carbon black is used in proportions which adversely affect both the plastics' mechanical properties and processibility.

We have now found that carbon black appropriately pretreated enables the adverse effects encountered heretofore in imparting antistatic properties to plastics material by means of standard carbon black, to be avoided. It is more particularly possible for the plastics material to be admixed with relatively minor proportions of such pretreated carbon black. Despite this, the plastics' flow resistance and surface resistance are considerably reduced without any significant adverse effect on their mechanical properties.

The present invention relates more particularly to an improved process for imparting antistatic properties to plastics by blending a pulverulent plastics material and, if desired further addends, with conductive carbon black and making the resulting blend into a moulding composition, the improvement according to which the plastics material is blended with about 4 to 12 weight % of conductive carbon black having a water absorption stiffness (AS-number) of 15 to 35, a specific electric resistance of $10^{-1}$ up to $10^{-3}$ ohms · cm under a moulding pressure of 100 to 180 atmospheres absolute, a bulk density of 100 to 180 g/liter, a BET-surface area of 100 to 1000 m$^2$/g, and having been made by a process wherein an aqueous suspension of carbon black having an AS-number higher than 15 and being prepared by subjecting hydrocarbons, which are liquid at room temperature, to thermal conversion at 1200 to 2000° C, under pressures within the range 1 and 80 atmospheres absolute, and in the presence of oxygen or an oxygen-containing gas, and water scrubbing the resulting carbon black-containing reaction gas, is intimately blended at temperatures within the range 5° and 120 ° C, under pressures within the range 1 and 20 atmospheres absolute, in liquid phase at a pH-value of 7 to 10, and for a period of 1 to 20 minutes, with vaporizable liquid aliphatic or cycloaliphatic hydrocarbons, the carbon black is separated from liquid matter, then heated and thereby freed from hydrocarbons and water, and finally annealed for 20 to 30 minutes at 200° up to 2200° C.

The process of the present invention enables antistatic properties to be imparted, e.g. to polyethylene, polyvinyl chloride, polypropylene or polystyrene. To achieve this, it is good practice to blend the respective pulverulent plastics material preferably with 8 to 12 weight % of carbon black. The resulting blend of pulverulent plastics material, carbon black and, if desired, addends and processing aids, is readily workable, e.g. by extrusion and granulation with the resultant formation of a moulding composition. The terms "addends" and "processing aids" as used herein comprise, e.g. stabilizers, softeners and lubricants.

The following statements are intended further to identify the particular carbon black used in the present process, and its preparation.

The starting materials used for making the carbon black are selected, for example, from high-boilling hydrocarbons, such as heavy fuel oil. These are burnt in conventional manner at about 1400° C and under pressure, and the resulting carbon black is separated from the combustion gases by scrubbing with water. The aqueous carbon black suspension so obtained, which has a pH of 7 to 10 and contains between about 5 and 40 g of carbon black per liter of suspension, is intimately blended with one or more vaporizable hydrocarbons, preferably with those which have a boiling point within the range 30° and 90° C, e.g. gasoline, and the resulting carbon black is separated from the liquid phase. Following this, the carbon black is dried at about 200° C and then annealed for 5 to 15 minutes at a preferred temperature within the range 1400° and 1800° C in the presence of nitrogen, hydrogen or carbon monoxide. It is also possible for the carbon black to be annealed at the above temperatures in the presence of chlorine gas, hydrogen chloride or one or more halogen-yielding compounds.

To incorporate the carbon black into the plastics material, it is good practice in a mixer to prepare a homogeneous blend of the pulverulent plastics material with the carbon black and standard addends, such as stabilizers, softeners, lubricants and similar aids. The resulting blend is plasticized in an extruder, made into strands and granulated. The resulting granulate may be further processed according to the use the plastics material is put to.

The process of the present invention compares favorably with the prior art methods inasmuch as the carbon black used in accordance with this invention enables the flow resistance and passage resistance of plastics material to be reduced to an extent not accessible heretofore without any significant adverse effects on the plastics' mechanical properties. This desirable technical effect is a result of the special treatment with vaporizable aliphatic or cycloaliphatic hydrocarbons which the carbon black or an aqueous suspension thereof is subjected to.

The following Examples illustrate the invention.

The starting material used for making the carbon black was carbon black, which was obtained in the form of an aqueous suspension containing 15 g of carbon black per liter by subjecting heavy fuel oil to a thermal conversion reaction with hydrogen and steam at 1400° C and under a pressure of 50 atm. abs., and waterscrubbing the resulting reaction gas.

200 l of the aqueous carbon black suspension, which had a pH of 9, was placed in an agitator-provided vessel, admixed with 6 kg of gasoline (boiling range = 30°–90° C) and the mixture was stirred for 10 minutes at 25° C and under a pressure of 1.2 atm. abs. to separate carbon black therefrom. 20 weight % of the resulting product was carbon black, 40 weight % was gasoline and 40 weight % was water. The product was freed from gasoline and water by heating to 200° C, and 3 kg of dry carbon black was obtained. The carbon black so freed from water and gasoline was subdivided in various specimens and the individual specimens were all annealed for 60 minutes under nitrogen, however, at temperatures ranging from 230° up to 1800° C.

The carbon black specimens so made were incorporated into various plastics materials and the latter were identified as to their flowability, notched impact strength, ball indentation hardness, flow resistance and surface resistance.

The flowability (melt index) was determined according to DIN 53 735 at 190° C under a load of 5 kg. The results are expressed in [g] per output quantity.

The notched impact strength was determined according to DIN 53 453. The moulded sheets were tested at 23° C, 3 and 24 hours, respectively, after preparation. The results are expressed in [kp cm/cm$^2$].

The ball indentation hardness was determined according to DIN 53 456. The results are expressed in [kg/cm$^2$].

The flow resistance and surface resistance were determined according to DIN 53 596. The results are expressed as follows:
(a) flow resistance in [ohm · cm]
(b) surface resistance in [ohm]

EXAMPLE 1: (Invention)

The following components were blended together for 1 minute in an intense mixer at 1500 rpm:
9 kg of pulverulent low pressure polyethylene with a melt index of 10.9 g/10 min.,
18 g of calcium stearate,
1.8 g of [octasecyl-3-(3,5-ditertiobutyl-4-hydrophenyl)-propionate], and
1 kg of carbon black annealed at 230° C.

The resulting pulverulent blend was placed in an extruder and made into strands which were granulated. The granules were placed on an automatic press and made into round sheets 4 mm thick and 120 mm wide, at a moulding temperature of 120° C and under a moulding pressure equal to 2 up to 10 metric tons total pressure, and the specimens for use in the individual tests were made from the sheets so produced.

The mechanical and electric properties of the test specimens made from the above blend are indicated in Table II hereinafter, and the characteristic properties of the carbon black are indicated in Table I hereinafter.

EXAMPLES 2 to 7: (Invention)

The procedure was the same as that described in Example 1 save that carbon black grades annealed at 300°, 400°, 600°, 1000°, 1500° and 1800° C, respectively, were used. The mechanical and electric properties of the individual test specimens are indicated in Table II hereinafter, and the characteristic properties of the various carbon black grades are indicated in Table I hereinafter.

EXAMPLE 8: (Comparative Example)

The procedure was the same as that described in Example 1, save that carbon black was not added. The mechanical and electric properties of the test specimen free from carbon black are indicated in Table II hereinafter.

EXAMPLE 9: (Comparative Example)

The procedure was the same as that described in Example 1, but the carbon black was compressed Acetogen (Acetogen is a registered trade mark) carbon black (a commercially available product produced formerly by Knapsack Aktiengesellschaft, Knapsack bei Koln, meanwhile merged into Hoechst Aktiengesellschaft, Frankfurt/Main).

The mechanical and electric properties of a test specimen containing the above carbon black are indicated in Table II hereinafter. Acetogen carbon black has an AS-number of 22 ml/5 g, determined by the ball method, and a BET-surface area of 70 m$^2$/g. An queous suspension of Acetogen carbon black has a pH of 7. The AS-number indicates that quantity in ml of a water/acetone-mixture (mixing ratio 9:1) which is needed to form a single ball from 5 g of carbon black in a round flask.

EXAMPLE 10: (Comparative Example)

The procedure was the same as that described in Example 1, but the carbon black was FLAMMRUSS 101 (this is a registered trade mark) a commercially available product of Degussa, Frankfurt/Main. FLAMMRUSS 101 has a BET-surface area of 21 m$^2$/g and a specific electric resistance of 0.04 ohm · cm at 300 atm. abs. An aqueous suspension of the carbon black has a pH of 7.

The mechanical and electric properties of a test specimen containing the carbon black of Example 10 are indicated in Table II hereinafter.

EXAMPLE 11: (Comparative Example)

The procedure was the same as that described in Example 1, but the carbon black was special furnace carbon black CORAX L (this is a registered trade mark), a commercially available product of Degussa, Frankfurt/Main. CORAX L has a BET-surface area of 150 m$^2$/g, and an aqueous suspension thereof has a pH of 7.

The mechanical and electric properties of a polyethylene specimen containing the above carbon black are indicated in Table II hereinafter.

EXAMPLE 12: (Invention)

The following components were blended together in a rapid mixer:
  880 g of polyvinyl chloride powder with a K-value of 70,
  20 g barium-cadmium laurate and
  100 g carbon black, annealed at 400° C in the manner described in Example 3.

The resulting powder mixture was placed on a mixing roll mill and homogenized and plasticized for 5 minutes at 160° C at a peripheral speed of 11 rpm. The rough sheet taken from the mill was placed on a press and made at 175° C, under 10 min. contact pressure and a moulding pressure of 150 kg/cm$^2$ into sheets with the dimensions of 150 × 120 × 6 mm. Specimens were prepared from the sheets so made and the flow resistance and surface resistance were identified. The results obtained are indicated in Table III hereinafter.

EXAMPLE 13: (Invention)

The procedure was the same as that described in Example 12, but the following components were blended together:
  616 g of polyvinyl chloride with a K-value of 70,
  246 g of dioctylphtalate,
  20 g of barium-cadmium-laurate, and
  100 g of carbon black annealed at 400° C as described in Example 3.

The resistance of test specimens was determined. The results obtained are indicated in Table III hereinafter.

EXAMPLE 14: (Comparative Example)

The procedure was the same as that described in Example 12, but the carbon black was ACETOGEN carbon black. The resistance of test specimens was determined. The results obtained are indicated in Table III hereinafter.

EXAMPLE 15: (Comparative Example)

The procedure was the same as that described in Example 13, but the carbon black was ACETOGEN carbon black. The resistance of test specimens was determined. The results obtained are indicated in Table III hereinafter.

EXAMPLE 16: (Invention)

The procedure was the same as that described in Example 1, but polypropylene having a melt index of 1.3 g/10 minutes and carbon black annealed at 400° C were used. The resistance of test specimens was determined. The results obtained are indicated in Table III hereinafter.

EXAMPLE 17: (Invention)

The procedure was the same as that described in Example 1, but polystyrene having a melt index of 4 g/10 minutes and carbon black annealed at 400° C were used. The resistance of test specimens was determined. The results obtained are indicated in Table III hereinafter.

Table II shows that the plastics specimens treated with the carbon black of this invention compare very favorably with specimens treated with conventional carbon black grades in respect of the values determined for the flow resistance and surface resistance. As results from the Table, those specimens which contained conventional carbon black in the concentrations indicated, could not be found to show an antistatic behaviour. The result is similar in Table III.

TABLE I

| Ex. | BET-surface area (m$^2$/g) | pH-value of aqueous carbon black suspension | AS-number (ml/5 g) | Annealing temperature (° C) |
| --- | --- | --- | --- | --- |
| 1 | about 690 | 7.9 | 32.5 | 230 |
| 2 | about 660 | 7.9 | 31.0 | 300 |
| 3 | about 690 | 9.2 | 32.0 | 400 |
| 4 | 670 | 8.2 | 29.0 | 600 |
| 5 | 640 | 9.7 | 25.0 | 1000 |
| 6 | 260 | 9.2 | 21.5 | 1500 |
| 7 | 160 | 9.4 | 20.0 | 1800 |

TABLE II

| Example | Melt index (g/10 min) | Notched impact strength 3 h (Kp.cm/cm$^2$) | Notched impact strength 24 h (Kp.cm/cm$^2$) | Ball indentation hardness (kg/cm$^2$) | Flow resistance (ohm.cm) | Surface resistance (ohm) |
| --- | --- | --- | --- | --- | --- | --- |
| 1 | 4.8 | 1.9 | 1.8 | 595 | $10^2$ | $10^3$ |
| 2 | 5.1 | 2.0 | 2.0 | 585 | $10^2$ | $10^3$ |
| 3 | 5.0 | 2.2 | 2.2 | 560 | $10^1$ | $10^3$ |
| 4 | 5.6 | 2.4 | 2.3 | 585 | $10^1$ | $10^3$ |
| 5 | 5.9 | 2.4 | 2.2 | 590 | $10^2$ | $10^3$ |
| 6 | 6.6 | 2.4 | 2.3 | 565 | $10^2$ | $10^3$ |
| 7 | 6.4 | 2.3 | 2.3 | 585 | $10^3$ | $10^4$ |
| 8 | 10.9 | 5.0 | 4.8 | 475 | $10^{15}$ | $10^{15}$ |
| 9 | 7.0 | 2.2 | 2.1 | 575 | $10^9$ | $10^7$ |
| 10 | 7.9 | 2.6 | 2.4 | 540 | $10^{16}$ | $10^{12}$ |
| 11 | 8.2 | 2.5 | 2.4 | 555 | $10^{15}$ | $10^{13}$ |

TABLE III

| Example | Flow resistance (ohm.cm) | Surface resistance (ohm) |
| --- | --- | --- |
| 12 | $10^4$ | $10^3$ |
| 13 | $10^3$ | $10^3$ |
| 14 | $10^{12}$ | $10^{12}$ |
| 15 | $10^{11}$ | $10^{12}$ |
| 16 | $10^3$ | $10^3$ |
| 17 | $10^2$ | $10^3$ |

We claim:

1. In the process for imparting antistatic properties to plastics by blending a pulverulent plastics material with conductive carbon black and making the resulting blend into a moulding composition, the carbon black having been made by subjecting hydrocarbons, which are liquid at room temperature, to thermal conversion at 1000° to 2000° C, under pressures within the range 1 to 80 atmospheres absolute, and in the presence of oxygen or an oxygen-containing gas, scrubbing the resulting carbon black-containing gas with water and separating the carbon black from the aqueous phase, the improvement which comprises intimately blending the aqueous, carbon black-containing phase with vaporizable liquid aliphatic or cycloaliphatic hydrocarbons at temperatures within the range 50° and 120° C, under pressures within the range 1 and 20 atmospheres absolute, at a pH-value of 7 to 10, and for a period of 1 to 20 minutes, separating liquid matter from the carbon black and then heating and thereby freeing it from hydrocarbons and water, annealing the carbon black for 20 to 30 minutes at 200° up to 2200° C and blending the carbon black having a water absorption stiffness (AS-number) of 15 to 35, a specific electric resistance of $10^{-1}$ up to $10^{-3}$ ohms · cm under a moulding pressure of 100 to 180 atmospheres absolute, a bulk density of 100 to 180 g/liter, and a BET-surface area of 100 to 1000 $m^2/g$ with pulverulent plastics material in an amount of about 4 to 12 weight %.

2. The process as claimed in claim 1, wherein the pulverulent plastics comprise polyethylene, polyvinyl chloride, polypropylene and polystyrene.

3. The process as claimed in claim 1, wherein the pulverulent plastics material is admixed with 8 up to 12 weight % of conductive carbon black.

4. The process as claimed in claim 1, wherein the blend of pulverulent plastics material, carbon black and, if desired, addends is extruded and the extruded material is granulated.

5. The process as claimed in claim 1, wherein the addends comprise stabilizers, softeners annd lubricants.

UNITED STATES PATENT AND TRADEMARK OFFICE
CERTIFICATE OF CORRECTION

PATENT NO. : 4,097,656
DATED : June 27, 1978
INVENTOR(S) : Dany et al

It is certified that error appears in the above-identified patent and that said Letters Patent are hereby corrected as shown below:

Column 4 line 39 change "queous" to --aqueous--.

Column 6 line 68 change "50°" to --5°--.

Signed and Sealed this

Sixth Day of March 1979

[SEAL]

Attest:

RUTH C. MASON
*Attesting Officer*

DONALD W. BANNER
*Commissioner of Patents and Trademarks*